United States Patent
Takahashi

(10) Patent No.: US 10,454,344 B2
(45) Date of Patent: Oct. 22, 2019

(54) ROTATING ELECTRICAL MACHINE UTILIZING COOLING LIQUID SUPPLIED TO COIL END TO COOL OTHER COMPONENTS

(71) Applicant: DENSO CORPORATION, Kariya, Aichi-pref. (JP)

(72) Inventor: Yuki Takahashi, Kariya (JP)

(73) Assignee: DENSO CORPORATION, Kariya (JP)

( * ) Notice: Subject to any disclaimer, the term of this patent is extended or adjusted under 35 U.S.C. 154(b) by 225 days.

(21) Appl. No.: 15/098,436

(22) Filed: Apr. 14, 2016

(65) Prior Publication Data
US 2016/0308414 A1  Oct. 20, 2016

(30) Foreign Application Priority Data
Apr. 17, 2015 (JP) .................. 2015-084978

(51) Int. Cl.
*H02K 5/20* (2006.01)
*H02K 9/19* (2006.01)
*H02K 11/33* (2016.01)

(52) U.S. Cl.
CPC .................. *H02K 9/19* (2013.01); *H02K 5/20* (2013.01); *H02K 11/33* (2016.01)

(58) Field of Classification Search
CPC .. H02K 3/24; H02K 9/19; H02K 5/20; H02K 11/33
USPC .......................................... 310/52, 58, 59, 64
See application file for complete search history.

(56) References Cited

U.S. PATENT DOCUMENTS

| | | | | | |
|---|---|---|---|---|---|
| 5,372,213 | A | * | 12/1994 | Hasebe | B60K 1/02 180/65.6 |
| 8,653,706 | B2 | * | 2/2014 | Fulton | H02K 9/19 310/52 |
| 10,211,706 | B2 | * | 2/2019 | Hayashi | H02K 5/10 |
| 2005/0235672 | A1 | * | 10/2005 | Hsu | H02K 5/20 62/259.2 |
| 2007/0278869 | A1 | * | 12/2007 | Taketsuna | H02K 3/24 310/54 |
| 2009/0184591 | A1 | * | 7/2009 | Hoshino | H02K 3/24 310/54 |
| 2013/0270931 | A1 | * | 10/2013 | Handa | H02K 1/32 310/43 |

(Continued)

FOREIGN PATENT DOCUMENTS

| | | |
|---|---|---|
| JP | 2007-020334 A | 1/2007 |
| JP | 2012-210027 A | 10/2012 |

*Primary Examiner* — John K Kim
(74) *Attorney, Agent, or Firm* — Oliff PLC

(57) ABSTRACT

A rotating electric machine includes a housing, a rotating shaft rotatably supported by the housing, a rotor fixed on the rotating shaft, a stator and a cooling device. The stator includes a stator core located radially outside the rotor and a stator coil wound on the stator core so as to have a coil end protruding from an axial end face of the stator core. The cooling device is configured to supply cooling liquid to an upper part of the coil end of the stator coil. The housing has a cooling liquid-receiving portion located vertically under the upper part of the coil end of the stator coil so as to receive the cooling liquid falling down from the upper part of the coil end. In a space formed inside the cooling liquid-receiving portion of the housing, there is arranged at least one of an electrical component and a heat sink.

5 Claims, 6 Drawing Sheets

(56) References Cited

U.S. PATENT DOCUMENTS

2014/0346905 A1* 11/2014 Matsui ................... H02K 9/19
                                                      310/54
2016/0308414 A1* 10/2016 Takahashi ............... H02K 9/19

* cited by examiner

ROTATING ELECTRICAL MACHINE UTILIZING COOLING LIQUID SUPPLIED TO COIL END TO COOL OTHER COMPONENTS

CROSS-REFERENCE TO RELATED APPLICATION

This application is based on and claims priority from Japanese Patent Application No. 2015-84978 filed on Apr. 17, 2015, the content of which is hereby incorporated by reference in its entirety into this application.

BACKGROUND

1. Technical Field

The present invention relates to rotating electric machines that are used in, for example, motor vehicles as electric motors and electric generators.

2. Description of Related Art

There are known rotating electric machines that are used in motor vehicles as electric motors and electric generators. These rotating electric machines generally include a rotor functioning as a field and a stator disposed in radial opposition to the rotor and functioning as an armature. Moreover, the stator includes a stator core and a stator coil. The stator core has a plurality of slots arranged in a circumferential direction thereof. The stator coil is wound on the stator core so as to be partially received in the slots of the stator core with a pair of annular coil ends respectively protruding from an opposite axial end faces of the stator core.

In the above rotating electric machines, the stator coil generates heat upon being supplied with electric current. Therefore, to prevent burnout of the rotating electric machines, it is necessary to cool them. To this end, there are disclosed, for example in Japanese Patent Application Publications No. JP2012210027A and No. JP2007020334A, cooling structures for cooling the coil ends of the stator coil with cooling liquid supplied by a cooling liquid supplier to the coil ends.

However, with the cooling structures disclosed in the above patent documents, most of the cooling liquid, which is supplied to the coil ends of the stator coil from the directly or obliquely upper side, falls down through void spaces formed between electric conductor wires constituting the coil ends. That is, most of the cooling liquid wastefully falls down without sufficiently fulfilling the cooling function.

On the other hand, to sufficiently fulfill the cooling function, it is preferable for the cooling liquid to flow downward along the outer peripheries of the annular coil ends while cooling them.

In addition, the rotating electric machines are generally driven by a drive circuit. However, electrical components of the drive circuit also generate heat during operation. Therefore, it is desirable to effectively cool the electrical components, thereby making it possible to minimize the size and improve the performance of the drive circuit.

SUMMARY

According to exemplary embodiments, a rotating electric machine is provided which includes a housing, a rotating shaft, a rotor, a stator and a cooling device. The rotating shaft is rotatably supported by the housing. The rotor is fixed on the rotating shaft. The stator includes an annular stator core and a stator coil wound on the stator core. The stator core is located radially outside the rotor so as to radially face the rotor. The stator coil has a coil end protruding from an axial end face of the stator core. The cooling device is configured to supply cooling liquid to an upper part of the coil end of the stator coil. Moreover, the housing has a cooling liquid-receiving portion located vertically under the upper part of the coil end of the stator coil so as to receive the cooling liquid falling down from the upper part of the coil end. In a space formed inside the cooling liquid-receiving portion of the housing, there is arranged at least one of an electrical component and a heat sink.

With the above configuration, it is possible to directly cool the housing using the cooling liquid which falls down from the upper part of the coil end of the stator coil onto the cooling liquid-receiving portion of the housing. Moreover, with the cooling liquid falling down onto the cooling liquid-receiving portion of the housing, it is also possible to indirectly cool the at least one of the electrical component and the heat sink arranged in the space formed inside the cooling liquid-receiving portion. Consequently, it is possible to secure high cooling performance of the rotating electric machine.

The heat sink may be preferably provided integrally with the cooling liquid-receiving portion of the housing so as to be in contact with the cooling liquid-receiving portion.

In the cooling liquid-receiving portion of the housing, there may be preferably formed a guide groove by which the cooling liquid falling down from the upper part of the coil end onto the cooling liquid-receiving portion is guided so as to be distributed to both circumferential sides.

The stator coil may be formed of a plurality of electric conductor wires, and the coil end of the stator coil may be constituted of end portions of the electric conductor wires which protrude from the axial end face of the stator core. In this case, it is preferable that the end portions of the electric conductor wires are substantially triangular ridge-shaped or stair-shaped.

BRIEF DESCRIPTION OF THE DRAWINGS

The present invention will be understood more fully from the detailed description given hereinafter and from the accompanying drawings of exemplary embodiments, which, however, should not be taken to limit the present invention to the specific embodiments but are for the purpose of explanation and understanding only.

In the accompanying drawings.

DESCRIPTION OF EMBODIMENTS

Figure 1:
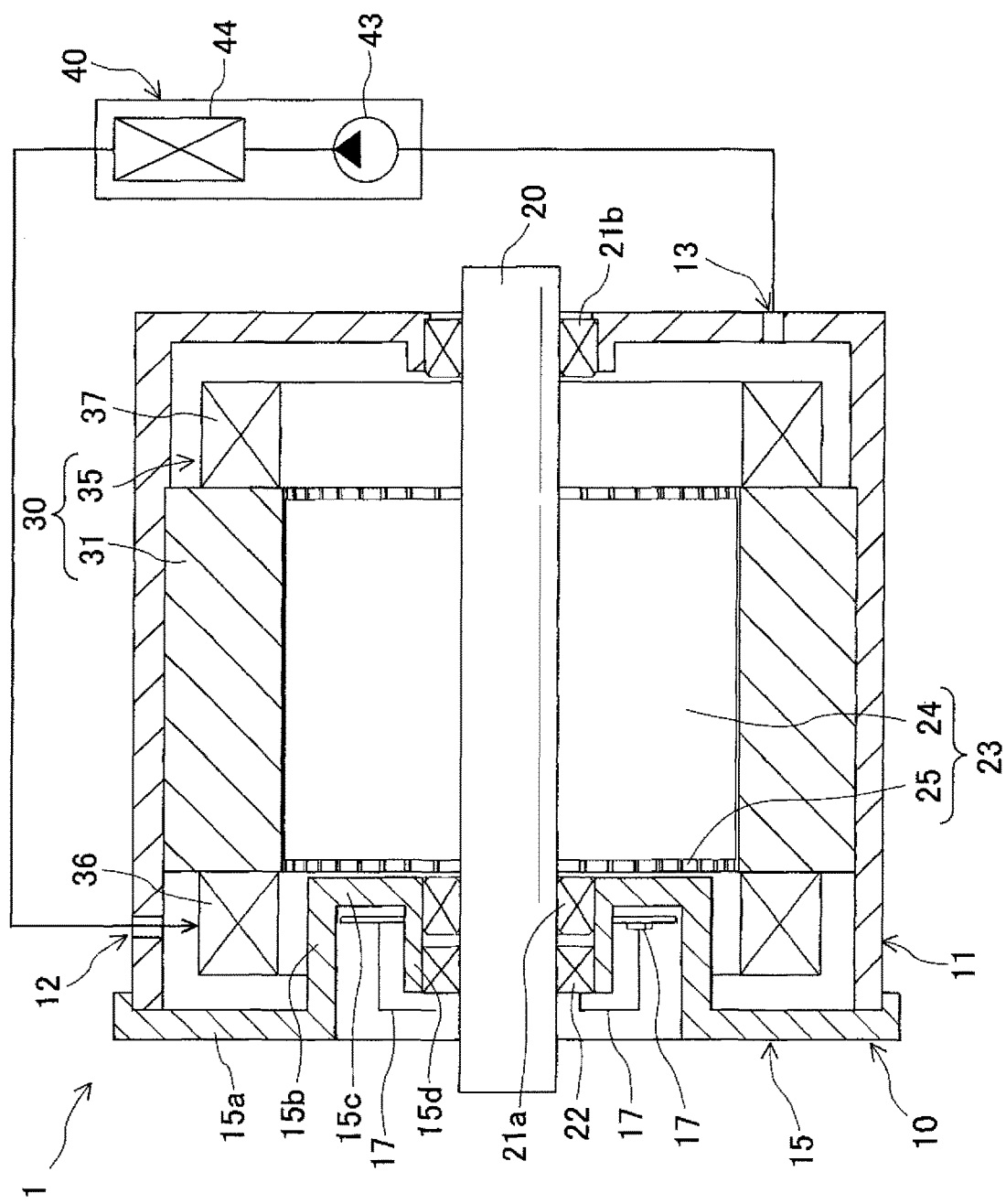
FIG. 1 is a schematic cross-sectional view, along an axial direction, of a rotating electric machine according to a first embodiment.

Exemplary embodiments and their modifications will be described hereinafter with reference to FIGS. 1-9. It should be noted that for the sake of clarity and understanding, identical components having identical functions throughout the whole description have been marked, where possible, with the same reference numerals in each of the figures and that for the sake of avoiding redundancy, descriptions of the identical components will not be repeated.

[First Embodiment]

FIG. 1 shows the overall configuration of a rotating electric machine 1 according to a first embodiment.

In the present embodiment, the rotating electric machine 1 is configured as an electric motor for a motor vehicle.

As shown in FIG. 1, the rotating electric machine 1 includes a housing 10, a rotating shaft 20, a rotor 23, a stator 30 that includes a stator core 31 and a stator coil 35, and a cooling device 40.

The housing 10 includes a main body 11 and a lid 15. The main body 11 is cylindrical cup-shaped to have an opening on a first axial side (i.e., the left side in FIG. 1) and a bottom wall on a second axial side (i.e., the right side in FIG. 1). The main body 11 is arranged so that an axial direction of the main body 11 coincides with a horizontal direction (i.e., the left-right direction in FIG. 1). The lid 15 is substantially disc-shaped and arranged on the first axial side of the main body 11 to cover (or close) the opening of the main body 11. In addition, both the main body 11 and the lid 15 are formed, for example, of an aluminum-based or iron-based metal having high heat conductivity.

In an upper part of an opening-side end portion (i.e., a left end portion in FIG. 1) of a circumferential wall of the main body 11, there is formed a discharge port 12 via which cooling liquid delivered by the cooling device 40 is discharged downward into the housing 10. The discharge port 12 is located vertically above a first coil end 36 of the stator coil 35; the first coil end 36 protrudes from a first axial end face (i.e., the left end face) of the stator core 31. Moreover, in a lower part of the bottom wall of the main body 11, there is formed a drain port 13 for draining the cooling liquid, which has been discharged into the housing 10 via the discharge port 12 and pooled in a bottom portion of an internal space of the main body 11, out of the housing 10.

The lid 15 includes a ring-shaped base plate 15a, an outer cylindrical wall 15b that protrudes from a radially-inner end part of the base plate 15a toward the second axial side (i.e., axially inward or rightward in FIG. 1), a ring-shaped tip wall 15c that extends from a second axial-side (i.e., right-side in FIG. 1) end of the outer cylindrical wall 15b radially inward, and an inner cylindrical wall 15d that extends from a radially-inner end part of the tip wall 15c toward the first axial side (i.e., axially outward or leftward in FIG. 1). The base plate 15a has a radially-outer end portion fixed to the opening-side end portion (i.e., the left end portion in FIG. 1) of the circumferential wall of the main body 11. The tip wall 15c is located on the second axial side (i.e., on the right side in FIG. 1) of the discharge port 12 formed in the main body 11. In other words, the tip wall 15c is located axially inward from the discharge port 12. The outer cylindrical wall 15b is located vertically under the discharge port 12, constituting a cooling liquid-receiving portion of the housing 10 for receiving the cooling liquid discharged into the housing 10 via the discharge port 12.

In a space defined by the outer cylindrical wall 15b, the tip wall 15c and the inner cylindrical wall 15d of the lid 15, there are arranged electrical components 17 of a drive circuit for driving the rotating electric machine 1. The electrical components 17 include, for example, a printed circuit board, capacitors, transistors and semiconductor switching elements. In addition, the electrical components 17 are fixed in contact with any of the outer cylindrical wall 15b, the tip wall 15c and the inner cylindrical wall 15d of the lid 15.

The rotating shaft 20 has its axial end portions rotatably supported by the housing 10 via a pair of bearings 21a and 21b. More specifically, one of the axial end portions of the rotating shaft 20 which is on the first axial side (i.e., the left side in FIG. 1) is supported via the bearing 21a that is fitted to the radially inner periphery of the inner cylindrical wall 15d of the lid 15 of the housing 10. The other axial end portion of the rotating shaft 20 which is on the second axial side (i.e., the right side in FIG. 1) is supported by the bearing 21b that is fitted in a circular hole formed in a central portion of the bottom wall of the main body 11 of the housing 10. In addition, on the first axial side of the bearing 21a, there is a seal member 22 also fitted to the radially inner periphery of the inner cylindrical wall 15d of the lid 15 of the housing 10.

The rotor 23 is coaxially fixed on the rotating shaft 20 so as to rotate together with the rotating shaft 20. Specifically, the rotor 23 includes a cylindrical rotor core 24 and a plurality of isotropic ring magnets 25. The rotor core 24 is fixedly fitted onto the radially outer periphery of an axial central portion of the rotating shaft 20. The ring magnets 25 are coaxially arranged in the rotor core 24. Consequently, on the radially outer periphery of the rotor core 24, there are formed a plurality of magnetic poles (e.g., four N poles and four S poles in the present embodiment), the polarities of which alternate between N (north) and S (south) in the circumferential direction of the rotor core 24.

The stator 30 includes the stator core 31 that is annular in shape and the stator coil 35 that is three-phase coil in the present embodiment. The stator core 31 has a plurality of slots (not shown) formed therein; the slots are spaced from one another in a circumferential direction of the stator core 31. The stator coil 35 is wound on the stator core 31 in a predetermined manner so as to be partially received in the slots of the stator core 31. The stator 30 is received in the housing 10 and located radially outside the rotor 23 so as to radially face the rotor 23. More specifically, a radially outer surface of the stator core 31 is fixedly fitted to a radially inner surface of the circumferential wall of the main body 11 of the housing 10.

Figure 2:
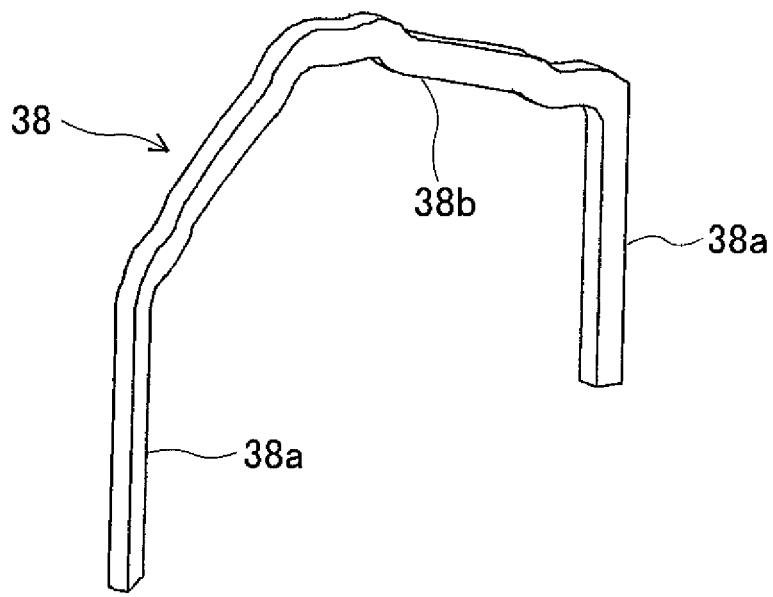
FIG. 2 is a perspective view of part of an electric conductor wire used for forming a stator coil of the rotating electric machine according to the first embodiment.

The stator coil 35 is formed of a plurality of electric conductor wires 38. Each of the electric conductor wires 38 includes a plurality of in-slot portions 38a and a plurality of end portions (or turn portions) 38b. Each of the in-slot portions 38a is received in one of the slots of the stator core 31. Each of the end portions 38b is located outside the slots of the stator core 31 and connects one adjacent pair of the in-slot portions 38a which are respectively received in two different ones of the slots. Moreover, in the present embodiment, as shown in FIG. 2, each of the end portions 38b is substantially triangular ridge-shaped.

Referring back to FIG. 1, the stator coil 35 has a pair of annular first and second coil ends 36 and 37 respectively protruding from the first and second axial end faces (i.e., the left and right end faces in FIG. 1) of the stator core 31. The first coil end 36 is constituted of those end portions 38*b* of the electric conductor wires 38 which are located on the first axial side (i.e., the left side in FIG. 1) of the stator core 31. The second coil end 37 is constituted of those end portions 38*b* of the electric conductor wires 38 which are located on the second axial side (i.e., the right side in FIG. 1) of the stator core 31. Therefore, in each of the first and second coil ends 36 and 37 of the stator coil 35, there are formed void spaces between adjacent pairs of the triangular ridge-shaped end portions 38*b* of the electric conductor wires 38.

As described previously, in the present embodiment, the first coil end 36 of the stator coil 35 is located vertically under the discharge port 12 formed in the main body 11 of the housing 10. Consequently, the cooling liquid is discharged from the discharge port 12 onto an uppermost part of the first coil end 36. Further, the cooling liquid falling down from the first coil end 36 is received by the outer cylindrical wall 15*b* of the lid 15 of the housing 10 (i.e., the cooling liquid-receiving portion of the housing 10).

The cooling device 40 includes a pump 43 for delivering the cooling liquid to the discharge port 12 and a heat dissipator (or radiator) 44 for dissipating heat of the cooling liquid which has been heated in the housing 10. Both the pump 43 and the heat dissipator 44 are arranged in a circulation circuit of the cooling liquid which is connected by pipes for delivering the cooling liquid from the drain port 13 to the discharge port 12.

More specifically, in the present embodiment, the circulation circuit is formed as follows. The cooling liquid, which is delivered by the pump 43 to the discharge port 12, is discharged out of the discharge port 12 onto the first coil end 36 of the stator coil 35. Then, the cooling liquid falls down from the first coil end 36 onto the outer cylindrical wall 15*b* of the lid 15 of the housing 10 (i.e., the cooling liquid-receiving portion of the housing 10). Further, the cooling liquid flows downward along the radially outer surface of the outer cylindrical wall 15*b* of the lid 15 while cooling the outer cylindrical wall 15*b*. Thereafter, the cooling liquid is drained out of the housing 10 via the drain port 13 formed in the bottom wall of the main body 11 of the housing 10. Then, the cooling liquid is again delivered by the pump 43 to the discharge port 12 through the heat dissipation by the heat dissipator 44. Further, the cooling liquid is again discharged out of the discharge port 12 onto the first coil end 36 of the stator coil 35.

In addition, in the present embodiment, ATF (Automotive Transmission Fluid) is used as the cooling liquid. However, it should be noted that other conventional cooling liquids, such as cooling oil, may also be used instead of ATF.

Next, operation of the rotating electric machine 1 according to the present embodiment will be described.

The rotating electric machine 1 is installed at a predetermined position in the vehicle so that: the axial direction of the rotating shaft 20 coincides with a horizontal direction; and the discharge port 12 is located vertically above the first coil end 36 of the stator coil 35.

Upon supply of electric current to the stator coil 35, the rotor 23 rotates in a predetermined direction. Moreover, with the rotation of the rotor 23, the rotating shaft 20 also rotates in the predetermined direction, driving other devices or components mechanically connected to the rotating shaft 20.

At the same time, the pump 43 and the heat dissipator 44 of the cooling device 40 start their operation, delivering the cooling liquid to the discharge port 12. Then, the cooling liquid is discharged out of the discharge port 12 onto the first coil end 36 of the stator coil 35.

Further, the cooling liquid discharged onto the first coil end 36 flows downward along the end portions 38*b* of the electric conductor wires 38 constituting the first coil end 36 while cooling the end portions 38*b*. In the present embodiment, the end portions 38*b* of the electric conductor wires 38 which constitute the first coil end 36 are triangular ridge-shaped. Therefore, part of the cooling liquid falls down, through the void spaces formed between adjacent pairs of the end portions 38*b* of the electric conductor wires 38, onto the outer cylindrical wall 15*b* of the lid 15 of the housing 10 (i.e., the cooling liquid-receiving portion of the housing 10). Then, this part of the cooling liquid flows downward along the radially outer surface of the outer cylindrical wall 15*b* of the lid 15 while cooling the outer cylindrical wall 15*b*. Consequently, the other parts (i.e., the base plate 15*a*, the tip wall 15*c* and the inner cylindrical wall 15*d*) of the lid 15 and the electrical components 17 fixed in contact with the lid 15 are also cooled via the outer cylindrical wall 15*b* of the lid 15.

Thereafter, the cooling liquid is drained out of the housing 10 via the drain port 13. Then, the cooling liquid is again delivered by the pump 43 to the discharge port 12 through the heat dissipation by the heat dissipator 44. Further, the cooling liquid is again discharged out of the discharge port 12 onto the first coil end 36 of the stator coil 35. In this manner, the rotating electric machine 1 is repeatedly cooled by the cooling liquid that circulates through the circulation circuit described above.

The rotating electric machine 1 according to the present embodiment has the following advantages.

In the present embodiment, the rotating electric machine 1 includes the housing 10, the rotating shaft 20, the rotor 23, the stator 30 and the cooling device 40. The rotating shaft 20 is rotatably supported by the housing 10. The rotor 23 is fixed on the rotating shaft 20. The stator 30 includes the annular stator core 31 and the stator coil 35 wound on the stator core 31. The stator core 31 is located radially outside the rotor 23 so as to radially face the rotor 23. The stator coil 35 has the first coil end 36 protruding from the first axial end face (i.e., the left end face in FIG. 1) of the stator core 31. The cooling device 40 is configured to supply the cooling liquid to an upper part (more particularly, the uppermost part in the present embodiment) of the first coil end 36 of the stator coil 35. Moreover, the housing 10 has the cooling liquid-receiving portion (i.e., the outer cylindrical wall 15*b* of the lid 15 in the present embodiment) located vertically under the upper part of the first coil end 36 of the stator coil 35 so as to receive the cooling liquid falling down from the upper part of the first coil end 36. In the space formed inside the cooling liquid-receiving portion of the housing 10 (i.e., the space defined by the outer cylindrical wall 15*b*, the tip wall 15*c* and the inner cylindrical wall 15*d* of the lid 15), there are arranged the electrical components 17 of the drive circuit for driving the rotating electric machine 1.

With the above configuration, it is possible to directly cool the housing 10 using the cooling liquid which falls down from the upper part of the first coil end 36 of the stator coil 35 onto the cooling liquid-receiving portion of the housing 10. Moreover, with the cooling liquid falling down onto the cooling liquid-receiving portion of the housing 10, it is also possible to indirectly cool the electrical components 17 arranged in the space formed inside the cooling liquid-receiving portion. Consequently, it is possible to secure high cooling performance of the rotating electric machine 1.

Moreover, in the present embodiment, the stator coil 35 is formed of the electric conductor wires 38. The first coil end 36 of the stator coil 35 is constituted of those end portions (or turn portions) 38*b* of the electric conductor wires 38 which protrude from the first axial end face (i.e., the left end face in FIG. 1) of the stator core 31. The end portions 38*b* of the electric conductor wires 38 are substantially triangular ridge-shaped (see FIG. 2).

With the above configuration, in the first coil end 36 of the stator coil 35, there are formed the void spaces between adjacent pairs of the triangular ridge-shaped end portions 38*b* of the electric conductor wires 38. Consequently, it is possible to effectively cool the housing 10 and the electrical components 17 by that part of the cooling liquid which falls down from the first coil end 36 of the stator coil 35 onto the cooling liquid-receiving portion of the housing 10 through the void spaces formed between adjacent pairs of the end portions 38*b* of the electric conductor wires 38.

[First Modification]

In the above-described first embodiment, each of the end portions 38*b* of the electric conductor wires 38 forming the stator coil 35 is substantially triangular ridge-shaped (see FIG. 2).

Figure 3:
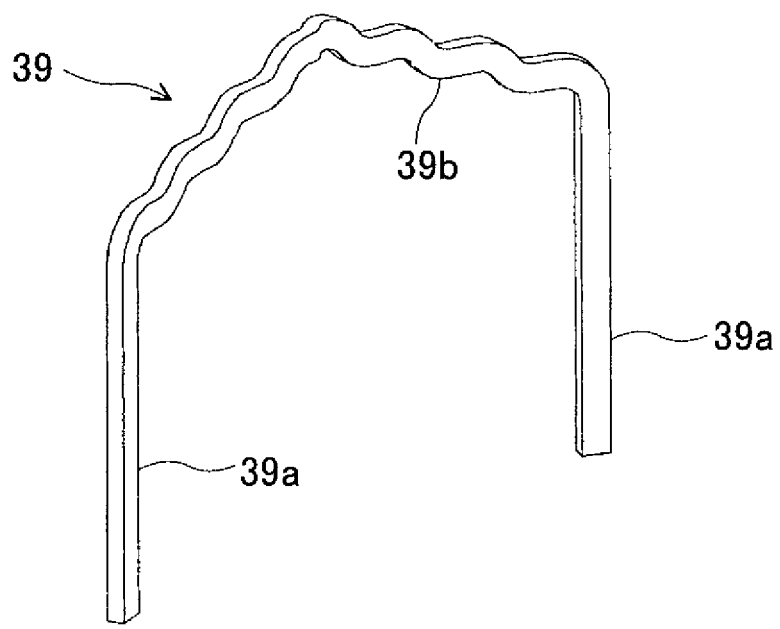
FIG. 3 is a perspective view of part of an electric conductor wire used for forming a stator coil according to a first modification.

In comparison, in this modification, the stator coil 35 is formed of a plurality of electric conductor wires 39. Referring to FIG. 3, each of the electric conductor wires 39 includes a plurality of in-slot portions 39*a* and a plurality of end portions (or turn portions) 39*b*. Each of the in-slot portions 39*a* is received in one of the slots of the stator core 31. Each of the end portions 39*b* is located outside the slots of the stator core 31 and connects one adjacent pair of the in-slot portions 39*a* which are respectively received in two different ones of the slots. Moreover, each of the end portions 38*b* is substantially stair-shaped.

With the stair-shape, it is possible to adjust the sizes of void spaces formed between adjacent pairs of the end portions 39*b* of the electric conductor wires 39. Moreover, it is also possible to densely arrange the end portions 39*b* of the electric conductor wires 39, thereby reducing the axial height (or protruding height) of the first and second coil ends 36 and 37 of the stator coil 35. Furthermore, with the dense arrangement of the end portions 39*b* of the electric conductor wires 39, it would be difficult for the cooling liquid to fall down through the void spaces formed between adjacent pairs of the end portions 39*b* of the electric conductor wires 39. Instead, it would be easy for the cooling liquid to leak down through the axial gap between the first coil end 36 of the stator coil 35 and the first axial end face of the stator core 31. Consequently, it would be possible to easily determine the leaking-down position of the cooling liquid, thereby further improving the cooling performance of the rotating electric machine 1.

[Second Embodiment]

Figure 4:
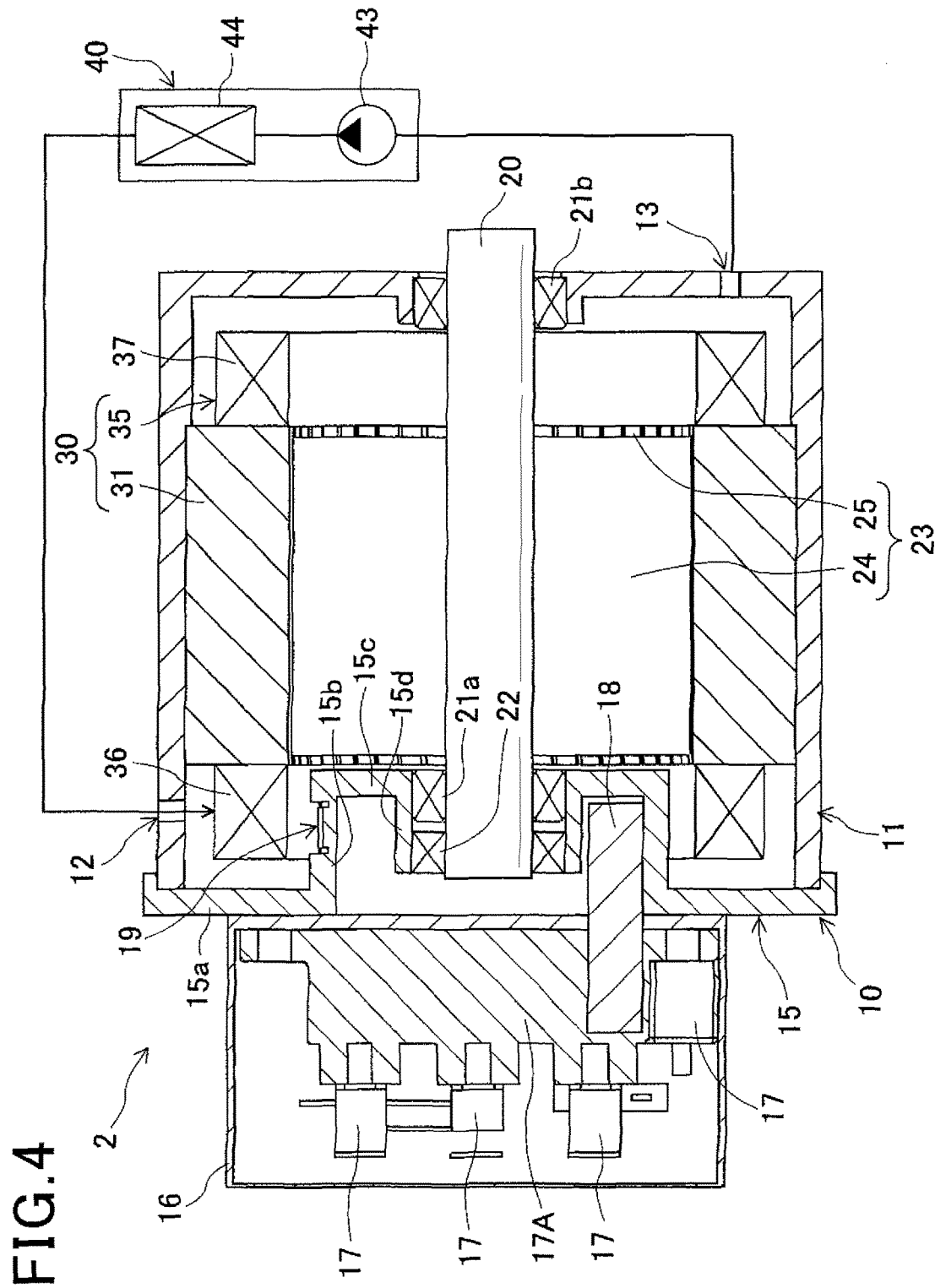
FIG. 4 is a schematic cross-sectional view, along an axial direction, of a rotating electric machine according to a second embodiment.

This embodiment illustrates a rotating electric machine 2 which has a similar structure to the rotating electric machine 1 according to the first embodiment; accordingly, only the differences of the rotating electric machine 2 from the rotating electric machine 1 will be mainly described hereinafter. In the present embodiment, as shown in FIG. 4, electrical components 17 of a drive circuit for driving the rotating electric machine 2 are arranged on a base mount 17A and received, together with the base mount 17A, in a case 16. The electrical components 17 include, for example, a printed circuit board, capacitors, transistors and semiconductor switching elements.

The case 16 is formed, for example, of an aluminum-based or iron-based metal having high heat conductivity, like the main body 11 and lid 15 of the housing 10. The case 16 is fixed in contact with that axial end face of the base plate 15*a* of the lid 15 of the housing 10 which is on the opposite side to the main body 11 of the housing 10.

In the present embodiment, the rotating electric machine 2 further includes a heat sink 18 that is formed, for example, of an aluminum-based, iron-based or copper-based metal having high heat conductivity, into the shape of a cuboid block. One half of the heat sink 18 which is on the second axial side (i.e., the right side in FIG. 4) is provided integrally with the lid 15 of the housing 10 so as to be in contact with the radially inner surface of the outer cylindrical wall 15*b* of the lid 15 (i.e., the cooling liquid-receiving portion of the housing 10). The other half of the heat sink 18 which is on the first axial side (i.e., the left side in FIG. 4) is embedded in the base mount 17A received in the case 16 so as to be in contact with both the base mount 17A and the case 16. Consequently, the heat sink 18 has a function of transferring heat from the base mount 17A and the case 16 to the outer cylindrical wall 15*b* of the lid 15 which is cooled by the cooling liquid. As a result, with the heat-transferring function of the heat sink 18, it is possible to cool the base mount 17A and the case 16 and thus the electrical components 17 arranged on the base mount 17A.

Figure 5:
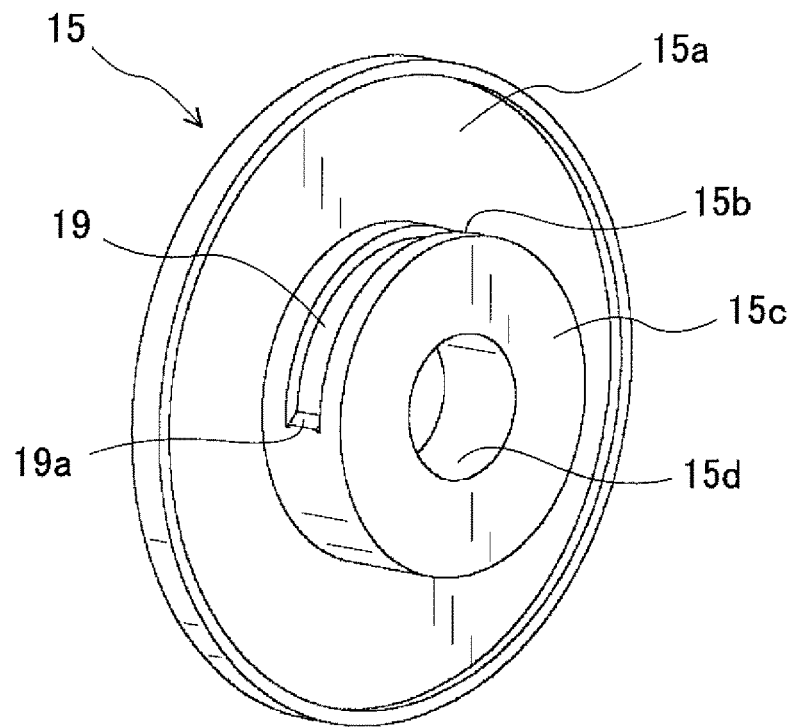
FIG. 5 is a perspective view of a lid of a housing of the rotating electric machine according to the second embodiment.
Figure 6:
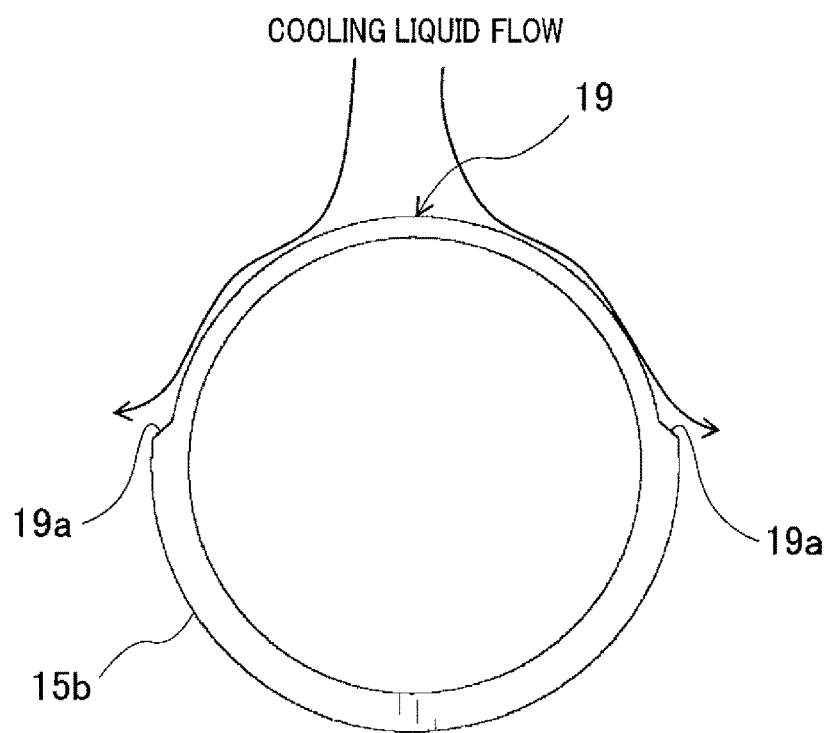
FIG. 6 is a schematic view illustrating the flow of cooling liquid that falls down onto a cooling liquid-receiving portion of the housing in the rotating electric machine according to the second embodiment.

Moreover, in the present embodiment, as shown in FIGS. 4-6, in the radially outer surface of the outer cylindrical wall 15*b* of the lid 15, there is formed a guide groove 19. The guide groove 19 is arc-shaped so as to extend from the top of the radially outer surface of the outer cylindrical wall 15*b* to both sides in the circumferential direction of the outer cylindrical wall 15*b*. Consequently, the cooling liquid falling down from the first coil end 36 of the stator coil 35 onto the outer cylindrical wall 15*b* of the lid 15 can be guided by the guide groove 19 so as to be distributed to both sides in the circumferential direction.

The guide groove 19 has a pair of end portions 19*a* respectively on opposite circumferential sides and lowest in the guide groove 19. Each of the end portions 19*a* is formed so as to be inclined downward from the radially inside to the radially outside (or from the bottom side to the opening side) of the guide groove 19.

Moreover, each of the end portions 19*a* of the guide groove 19 has its lowest edge located vertically higher than a horizontal line L1 that extends through the central axis o of the rotating shaft 20.

Figure 7:
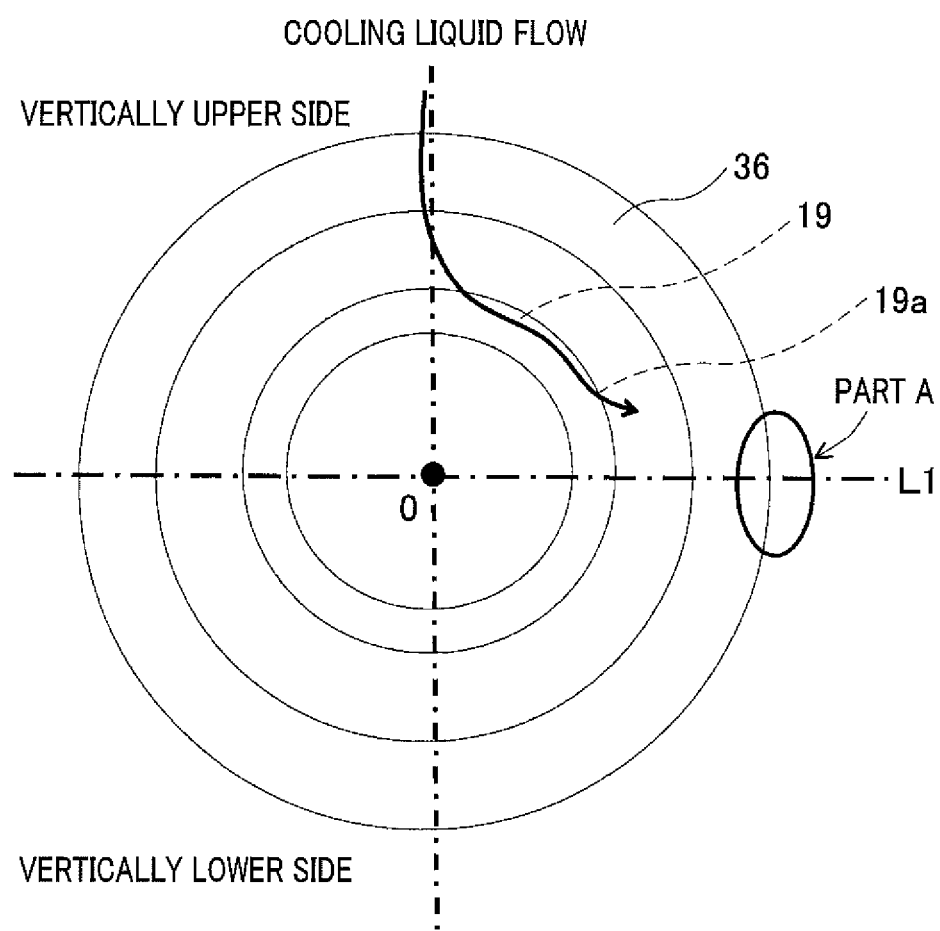
FIG. 7 is a schematic view illustrating the flow of the cooling liquid falling down from a coil end onto the cooling liquid-receiving portion of the housing in the rotating electric machine according to the second embodiment.

Specifically, as shown in FIG. 7, it is most difficult for the cooling liquid discharged onto the uppermost part of the first coil end 36 of the stator coil 35 to reach those radially outer parts (i.e., parts designated by A in FIG. 7) of the first coil end 36 through which the horizontal line L1 extends. Therefore, to cause the cooling liquid to flow to the radially outer parts A of the first coil end 36, it is preferable to locate the lowest edges of the end portions 19*a* of the guide groove 19 on the vertically upper side of the horizontal line L1.

The above-described rotating electric machine 2 according to the present embodiment has the same advantages as the rotating electric machine 1 according to the first embodiment.

In particular, in the present embodiment, the heat sink 18 is provided integrally with the lid 15 of the housing 10 so as to be in contact with the radially inner surface of the outer cylindrical wall 15*b* of the lid 15 (i.e., the cooling liquid-receiving portion of the housing 10). Consequently, it is possible to secure high cooling performance of the rotating electric machine 2. Moreover, in the present embodiment, in the outer cylindrical wall 15*b* of the lid 15 (i.e., the cooling liquid-receiving portion of the housing 10), there is formed the guide groove 19 by which the cooling liquid falling down from the first coil end 36 of the stator coil 35 onto the outer cylindrical wall 15b is guided so as to be distributed to both circumferential sides. Consequently, with the guide groove 19, it is possible to return the cooling liquid, which has once fallen down from the first coil end 36 of the stator coil 35, to the radially outermost parts A of the first coil end 36. As a result, it is possible to reuse the cooling liquid, thereby more effectively cooling the first coil end 36 of the stator coil 35.

In addition, in the rotating electric machine 2, welds for forming a neutral point of the three-phase stator coil 35 and welds (or joints) for forming power lines that connect the stator coil 35 to the drive circuit are weak to heat. Moreover, in the vehicle, there is generally a larger room to arrange components in the width direction of the vehicle than in the height direction (i.e., the vertical direction). Therefore, the power lines are often arranged in close vicinity to the radially outer parts A of the first coil end 36. However, in the present embodiment, with the guide groove 19 described above, it is still possible to effectively cool the power lines using the cooling liquid.

[Second Modification]

In the above-described second embodiment, the guide groove 19 is formed in the radially outer surface of the outer cylindrical wall 15b of the lid 15 by cutting off a radially outer peripheral portion of the outer cylindrical wall 15b of the lid 15.

Figure 8:
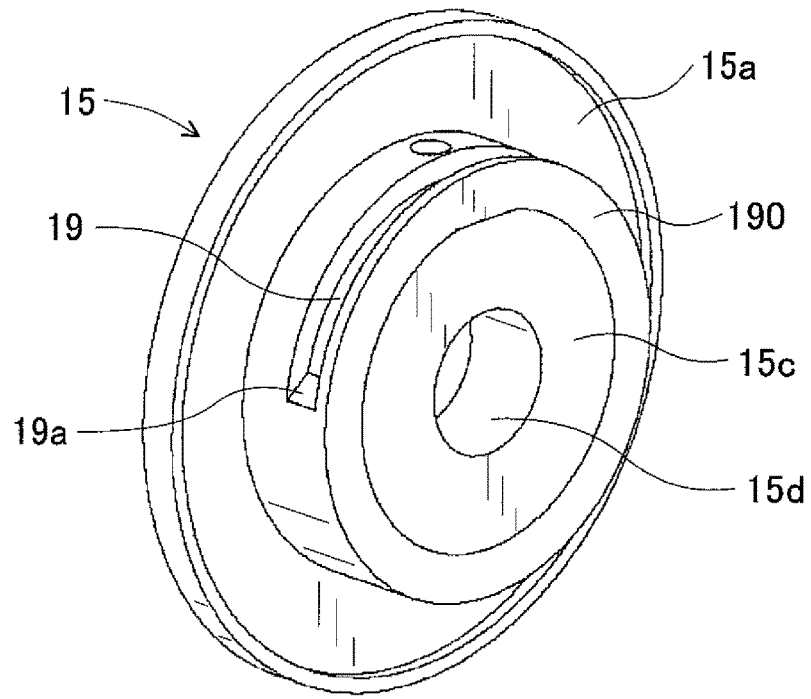
FIG. 8 is a perspective view of a lid of a housing according to a second modification.
Figure 9:
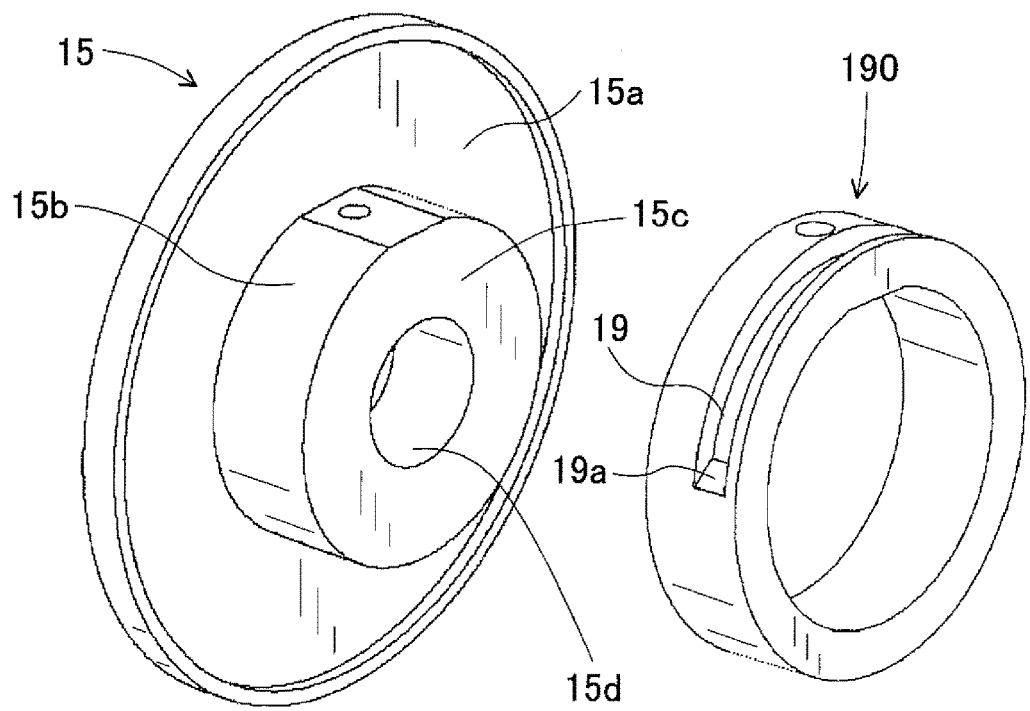
FIG. 9 is an exploded perspective view of the lid of the housing according to the second modification.

In comparison, in this modification, as shown in FIGS. 8 and 9, the lid 15 of the housing 10 further includes a ring member 190 in addition to the base plate 15a, the outer cylindrical wall 15b, the tip wall 15c and the inner cylindrical wall 15d. Moreover, the guide groove 19 is not formed in the radially outer surface of the outer cylindrical wall 15b of the lid 15. Instead, the guide groove 19 is formed in the radially outer surface of the ring member 190, and the ring member 190 is fitted on the radially outer surface of the outer cylindrical wall 15b of the lid 15. That is, in this modification, the outer cylindrical wall 15h and the ring member 190 of the lid 15 together constitute the cooling liquid-receiving portion of the housing 10.

While the above particular embodiments and modifications have been shown and described, it will be understood by those skilled in the art that various further modifications, changes, and improvements may be made without departing from the spirit of the present invention.

For example, in the previous embodiments, the present invention is directed to the rotating electric machines 1 and 2 which are configured as electric motors. However, the present invention can also be applied to other rotating electric machines, such as an electric generator or a motor-generator that can selectively function either as an electric motor or as an electric generator.

What is claimed is:

1. A rotating electric machine comprising:
    a housing;
    a rotating shaft rotatably supported by the housing;
    a rotor fixed on the rotating shaft;
    a stator including an annular stator core and a stator coil wound on the stator core, the stator core being located radially outside the rotor so as to radially face the rotor, the stator coil having a coil end protruding from an axial end face of the stator core; and
    a cooling device configured to supply cooling liquid to an upper part of the coil end of the stator coil,
    wherein
    the rotating electric machine further comprises: (a) an electrical component; and (b) a heat sink provided for cooling the electrical component,
    the housing includes a cylindrical wall that has a cooling liquid-receiving portion located vertically under the upper part of the coil end of the stator coil so as to receive the cooling liquid falling down from the upper part of the coil end, and
    in a space formed inside the cylindrical wall of the housing, there is arranged the heat sink.

2. The rotating electric machine as set forth in claim 1, wherein the heat sink is provided integrally with the cylindrical wall of the housing so as to be in contact with the cylindrical wall.

3. The rotating electric machine as set forth in claim 1, wherein in the cooling liquid-receiving portion of the cylindrical wall of the housing, there is formed a guide groove by which the cooling liquid falling down from the upper part of the coil end onto the cooling liquid-receiving portion is guided so as to be distributed to both circumferential sides.

4. The rotating electric machine as set forth in claim 1, wherein the stator coil is formed of a plurality of electric conductor wires,
    the coil end of the stator coil is constituted of end portions of the electric conductor wires which protrude from the axial end face of the stator core, and
    the end portions of the electric conductor wires are substantially triangular ridge-shaped or stair-shaped.

5. The rotating electric machine as set forth in claim 1, wherein the heat sink is formed of a heat-conductive metal into the shape of a cuboid plate.

* * * * *